US009998569B2

(12) United States Patent
Roeland et al.

(10) Patent No.: US 9,998,569 B2
(45) Date of Patent: Jun. 12, 2018

(54) HANDLING MULTIPATH TRANSMISSION CONTROL PROTOCOL SIGNALING IN A COMMUNICATIONS NETWORK

(71) Applicant: Telefonaktiebolaget L M Ericsson (publ), Stockholm (SE)

(72) Inventors: Dinand Roeland, Sollentuna (SE); Gunnar Mildh, Sollentuna (SE); Stefan Rommer, Västra Frölunda (SE); Jari Vikberg, Järna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 242 days.

(21) Appl. No.: 14/647,564

(22) PCT Filed: Dec. 14, 2012

(86) PCT No.: PCT/EP2012/075619
§ 371 (c)(1),
(2) Date: May 27, 2015

(87) PCT Pub. No.: WO2014/090335
PCT Pub. Date: Jun. 19, 2014

(65) Prior Publication Data
US 2015/0312383 A1  Oct. 29, 2015

(51) Int. Cl.
*H04L 29/06* (2006.01)
*H04W 36/08* (2009.01)
*H04L 12/707* (2013.01)

(52) U.S. Cl.
CPC .............. *H04L 69/14* (2013.01); *H04L 45/24* (2013.01); *H04L 69/18* (2013.01); *H04W 36/08* (2013.01)

(58) Field of Classification Search
None
See application file for complete search history.

(56) References Cited

U.S. PATENT DOCUMENTS

2008/0148399 A1  6/2008 Winkler
2011/0265182 A1  10/2011 Peinado et al.
(Continued)

FOREIGN PATENT DOCUMENTS

| CN | 101925125 A | 12/2010 |
| WO | 2011/127189 A2 | 10/2011 |
| WO | 2012/116897 A1 | 9/2012 |

OTHER PUBLICATIONS

Notice of Reasons for Rejection for Japan Application No. 2015-546870, dated Aug. 2, 2016, 3 pages.
(Continued)

*Primary Examiner* — Ayaz Sheikh
*Assistant Examiner* — Sori Aga
(74) *Attorney, Agent, or Firm* — Nicholson De Vos Webster & Elliott LLP

(57) ABSTRACT

A method and apparatus for handling Multipath Transmission Control Protocol, MPTCP, signaling in a communications network. The communications network includes a first node hosting an MPTCP proxy function, and a second node in a second access network. The second node receives from a mobile terminal an attachment request. The second node then sends a message to a remote database and receives a response, the response including an identity of the first node. An MPTCP data path can then be redirected from the second access network to the MPTCP proxy function. Even in cases where the MPTCP proxy function is located at or between the PDN Gateway and the mobile terminal, the second access can be made aware of the location of the MPTCP proxy function and route MPTCP data traffic accordingly.

21 Claims, 14 Drawing Sheets

(56) References Cited

U.S. PATENT DOCUMENTS

| | | | |
|---|---|---|---|
| 2011/0296006 A1* | 12/2011 | Krishnaswamy | H04L 29/12952 709/224 |
| 2012/0093150 A1 | 4/2012 | Kini | |
| 2012/0144062 A1 | 6/2012 | Livet et al. | |
| 2013/0007286 A1* | 1/2013 | Mehta | H04W 76/02 709/227 |
| 2015/0295797 A1* | 10/2015 | Kneckt | H04L 43/062 370/252 |

OTHER PUBLICATIONS

Notice of Preliminary Rejection for Korea Application No. 2015-7016859, dated Oct. 31, 2016, 10 pages.
"3rd Generation Partnership Project; Technical Specification Group Services and System Aspects; Architecture enhancements for non-3GPP accesses (Release 11)," 3GPP TS 23.402 v11.4.0 (Sep. 2012), 261 pages.
First Office Action for foreign counterpart China Application No. 201280077701.4, dated Feb. 21, 2017, 2 pages.
Notice of Reasons for Rejection for Japan Application No. 2015-546870, dated Apr. 11, 2017, 2 pages.
Olivier Bonaventure et al., "An Overview of Multipath TCP", USENIX login, vol. 37, No. 5, Oct. 29, 2012, pp. 1-9.
International Search Report and Written Opinion for International Application No. PCT/EP2012/075619, dated Sep. 2, 2013, 8 pages.
Ed T. Li, "Recommendation for a Routing Architecture; draft-irtf-rrg-recommendation-14," Internet Research Task Force, Sep. 17, 2010, pp. 1-74.
Ford et al., "Architectural Guidelines for Multipath TCP Development," Internet Engineering Task Force, Request for Comments: 6182, Mar. 2011, pp. 1-26.
International Preliminary Report on Patentability for Application No. PCT/EP2012/075619, dated Jun. 25, 2015, 6 pages.
Notice of Final Rejection from foreign counterpart Korean Patent Application No. KR1020157016859, dated Jun. 27, 2017, 4 pages.
Notice of Reasons for Refusal from foreign counterpart Japan Application No. 2015-546870, dated Mar. 27, 2017, 4 pages.
Notification to Grant Patent Right for Invention from foreign counterpart China Patent Application No. 201280077701.4, dated Aug. 14, 2017, 3 pages.
Notice of Allowance from foreign counterpart Korean Patent Application No. KR1020157016859, dated Nov. 13, 2017, 3 pages.
Decision to Grant a patent from foreign counterpart Japanese Patent Application No. 2015-546870, dated Jan. 19, 2018, 5 pages.

* cited by examiner

HANDLING MULTIPATH TRANSMISSION CONTROL PROTOCOL SIGNALING IN A COMMUNICATIONS NETWORK

CROSS-REFERENCE TO RELATED APPLICATIONS

This application is a National stage of International Application No. PCT/EP2012/075619, filed Dec. 14, 2012, which is hereby incorporated by reference.

TECHNICAL FIELD

The invention relates to the field of handling Multipath TCP signalling in a communications network and, in particular, to handling Multipath TCP signalling sent via a proxy function.

BACKGROUND

A Transmission Control Protocol (TCP) session can be defined as "A logical end-to-end data communication link between two applications, using TCP as protocol". Regular TCP restricts communication to a single path per session. Internet Engineering Task Force (IETF) is currently developing mechanisms to add a capability of simultaneously using multiple paths in a regular TCP session. The extensions to TCP, called "multi-path TCP" (MPTCP) are described in Internet-Draft "draft-ietf-mptcp-multiaddressed". Architectural guidelines for multipath TCP development have been published in RFC 6182. RFC 6182 defines "path" as a "sequence of links between a sender and a receiver, defined in this context by a source and destination address pair".

In many cases multiple paths exist between peers. An example of this is the case where one or both of the end-devices are multi-homed and/or have connectivity via more than one access technology. For example, in a $3^{rd}$ Generation Partnership Project (3GPP) multi-access scenario a User Equipment (UE) device may be connected via both a 3GPP access (such as GERAN, UTRAN, E-UTRAN) and a Wireless Local Area Network (WLAN) access simultaneously. The simultaneous use of these multiple paths for a TCP session would improve resource usage within the network, and improve user experience through higher throughput and improved resilience to network failure. The use of MPTCP over multiple accesses would allow the user traffic to be either routed only over one of the accesses or simultaneously over multiple accesses. It would also allow the traffic to be moved in a seamless fashion between accesses depending on coverage, radio link quality or other factors.

In regular TCP, one TCP session between two hosts corresponds to one TCP flow between those hosts, carried over a single path. Referring to FIG. 1 herein, in MPTCP, one TCP session between two hosts 1, 2 corresponds to one or more MPTCP subflows between those hosts, each carried over a path. A subflow is defined by a 5-tuple (source address, source port, destination address, destination port, protocol).

The model illustrated in FIG. 1 requires that both hosts are MPTCP-capable. In practice, when MCTCP is introduced to networks it is likely to be introduced in an incremental way. There is therefore a high risk that only one host will support MPTCP. To overcome this problem, it has been suggested that an MPTCP proxy 3 may be used, as illustrated in FIG. 2. One use case may be that the MPTCP proxy is placed in the network of an operator, and that the MPTCP-capable host is a UE controlled by the operator.

As shown in FIG. 2 a single TCP session between Host A 1 and Host B 2 corresponds to one or more MPTCP subflows between Host A 1 and a proxy node 3, and to a single TCP flow between the proxy node 3 and Host B 2. The proxy node 3 multiplexes the MPTCP subflows towards Host B 2 into a single TCP flow, and demultiplexes the single flow towards Host A 1 into subflows. The MPTCP proxy function 3 is currently being defined by IETF in Internet-Draft "draft-hampel-mptcp-proxies-anchors".

RFC 6182 defines a regular/single-Path TCP as the standard version of TCP in use, operating between a single pair of IP addresses and ports. Multipath TCP is defined as a modified version of the TCP protocol that supports the simultaneous use of multiple paths between hosts. A path is defined as a sequence of links between a sender and a receiver, defined in this context by a source and destination address pair. A Host is defined as an end host either initiating or terminating a Multipath TCP connection. A subflow is defined as a flow of TCP segments operating over an individual path, which forms part of a larger Multipath TCP connection. A MPTCP connection is defined as a set of one or more subflows combined to provide a single Multipath TCP service to an application at a host. RFC 6182 also notes that MPTCP makes use of (what appear to the network to be) standard TCP sessions, termed "subflows", to provide the underlying transport per path, and as such these retain the network compatibility desired. MPTCP-specific information is carried in a TCP-compatible manner, although this mechanism is separate from the actual information being transferred.

There are different options on the location of an MPTCP proxy 3 in the network. It is possible to locate the MPTCP proxy 3 "below or in a Packet Data Network Gateway (PGW)", in other words, between a PGW and Host A, or example in Host A's 1 access network. This gives rise to two problems; how can a common MPTCP proxy 3 be found by both access networks (e.g. 3GPP and WLAN accesses), and how can both access networks route the MPTCP traffic to that common MPTCP proxy? There are currently no solutions.

SUMMARY

It is an object to provide mechanisms by which an MPTCP proxy function common to two access networks can be located by both access networks in the event that the MPTCP proxy function is located at or below a PGW.

According to a first aspect, there is provided a method of handling Multipath Transmission Control Protocol (MPTCP) signalling in a communications network. The communications network includes a first node hosting an MPTCP proxy function, and a second node in a second access network. The second node receives from a mobile terminal an attachment request. It then sends a message to a remote database and receives a response, the response including an identity of the first node. An MPTCP data path can then be redirected from the second access network to the MPTCP proxy function. This has the advantage that, even in cases where the MPTCP proxy function is located at or between the PDN Gateway and the mobile terminal, the second access can be made aware of the location of the MPTCP proxy function and route MPTCP data traffic accordingly.

As an option, the second node receives MPTCP data and routes at least the received MPTCP data via the MPTCP proxy function. However, note that the second node may not be the node that performs this function.

As a further option, a determination is made whether data sent to the second node comprises MPTCP data. If the data does not comprise MPTCP data, it is sent directly towards its destination. This ensures that non-MPTCP data is not unnecessarily rerouted.

As an option, the remote database is a User Context Database (UCD) and the message comprises a query for the identity of the first node hosting the MPTCP proxy function. As an alternative option, the remote database is a storing function comprising a Home Subscriber Server.

The method optionally includes establishing a tunnel between the second node and the MPTCP proxy function, the tunnel being used for sending at least MPTCP data. Alternatively, where the second node does not itself handle MPTCP data, the method optionally includes sending an instruction to an MPTCP node in the second access network to establish a tunnel between the MPTCP proxy function and the MPTCP node, the tunnel being used for sending at least MPTCP data.

The attachment request optionally includes an MPTCP attachment type indicator indicating that the mobile terminal is capable of handling an MPTCP session.

As an option, the MPTCP proxy function is located in a first access network.

In optional embodiments, the second access network is selected from any of a Wireless Local area Network, an Evolved Universal Terrestrial Radio Access Network, a GSM EDGE Radio Access Network, a Universal Terrestrial Radio Access Network, a Wideband Code Division Multiple Access network and a High Speed Packet Access network.

The second node is optionally selected from any of an Access Controller, an eNodeB, a Radio Network Controller, a Serving GPRS Support node, a Mobility Management Entity and a Serving Gateway.

The first node hosting the MPTCP proxy function is optionally selected from any of a Packet Data Network Gateway, an Access Controller, an eNodeB, a Radio Network Controller and a Serving Gateway.

According to a second aspect, there is provided a method of handling MPTCP data in a communications network sent via an MPTCP proxy function. A first node in a first access network receives from a mobile terminal an attachment request. It sends a message to a remote database and receives a response, the response indicating that the first node may host the MPTCP proxy function. It can then receive MPTCP data routed from a second access network. This advantageously allows MPTCP data to be sent over two access networks, and routed via one MPTCP proxy function.

The first node optionally comprises any of a Packet Data Network Gateway, an Access Controller, an eNodeB, a Radio Network Controller and a Serving Gateway.

As a further option, the message includes an instruction for the remote database to store an identity of the first node hosting the MPTCP proxy function. This allows the database to provide the information to nodes in other access networks.

According to a third aspect, there is provided a node for determining an identity of a MPTCP proxy function in a communications network. The node is provided with a first receiver for receiving from a mobile terminal an attachment request, a first transmitter for sending to a remote database a message, and a second receiver for receiving from the remote database (14; 15) a response, the response including an identity of a first node hosting the MPTCP proxy function. This advantageously allows the node to find the identity of the MPTCP proxy function and route (or instruct the routing of) MPTCP traffic to the MPTCP proxy function.

As an option, the node is provided with a third receiver for receiving MPTCP data and a second transmitter for sending the received MPTCP data towards the MPTCP proxy function.

According to a fourth aspect, there is provided a node arranged to handle MPTCP signalling in a communications network sent via an MPTCP proxy function. The node is provided with a first receiver for receiving from a mobile terminal an attachment request. A first transmitter is provided for sending to a remote database a message. A second receiver is provided for receiving from the remote database a response, the response indicating that the node may host the MPTCP proxy function (3). A third receiver is provided for receiving MPTCP data routed from a node in a second access network.

According to a fifth aspect, there is provided a mobile terminal for use in a communications network. The mobile terminal comprises a first transmitter for sending a first request to attach to a first access network, the first request including an indicator that the mobile terminal is capable of handling a MPTCP session. The mobile terminal is also provided with a second transmitter for sending a second request to attach to a second access network, the second request including the indicator.

According to a sixth aspect, there is provided a computer program comprising computer readable code which, when run from a computer readable medium in the form of a memory, in a processor at a node, causes the node to perform the method as described above in the first or second aspects.

According to a seventh aspect, there is provided a computer program product comprising a computer readable medium and a computer program as described above in the sixth aspect, wherein the computer program is stored on the computer readable medium.

According to an eighth aspect, there is provided a method as described above in either the first or second aspects, when operated on a vessel or vehicle.

According to a ninth aspect, there is provided a node or device as described in any of the third, fourth or fifth aspects above when applied to a vessel or vehicle.

DETAILED DESCRIPTION

Figure 3:
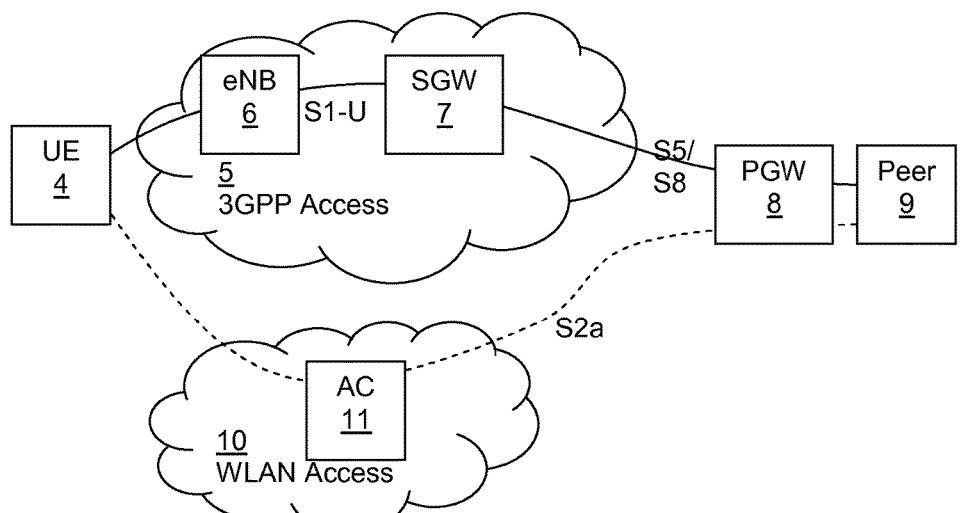
FIG. 3 illustrates schematically in a block diagram an exemplary network architecture.

Referring to FIG. 3 herein, there is illustrated an exemplary network architecture. This is a simplified figure of the architecture described in 3GPP TS 23.401 and 3GPP TS 23.402, and shows mainly the user plane parts. It should be noted that while FIG. 3 illustrates a Long Term Evolution (LTE) architecture in the 3GPP side, similar techniques can be applied to other types of communications network such as WCDMA/HSPA. In this case, the node corresponding to the eNB 6 would be a Radio Network Controller (RNC), or a combined NodeB/RNC.

A mobile terminal, such as a User Equipment (UE) 4, has a dual radio, one 3GPP radio (e.g. LTE or WCDMA/HSPA) and one WLAN radio. When using the 3GPP Access Network 5, the UE 4 communicates with a Peer 9 in a PDN network via an eNodeB 6 and a Serving Gateway (SGW) 7, and subsequently a PGW 8. When using the WLAN access network 10, the communication between the PGW 8 and the UE 4 traverses an Access Controller (AC) 11, the AC being an access router. In this example, the UE 4 connects with the AC 11 via a WiFi Access Point (AP).

The access networks 5, 10 provide the UE 4 with a connection to the Peer 9 in the PDN. Such a PDN connection can be thought of as a virtual (IP) tunnel between the UE 4 and the PDN. The PGW 8 terminates the PDN connection.

Note that the architecture shown in FIG. 3 is functional. It may be that several functions can be co-located at a single node, or functions may be located at different nodes. For example, it is known to combine the SGW 7 and the PGW 8 into a single node, and it is known to combine the AC 11 with an RNC (not shown).

Figure 4:
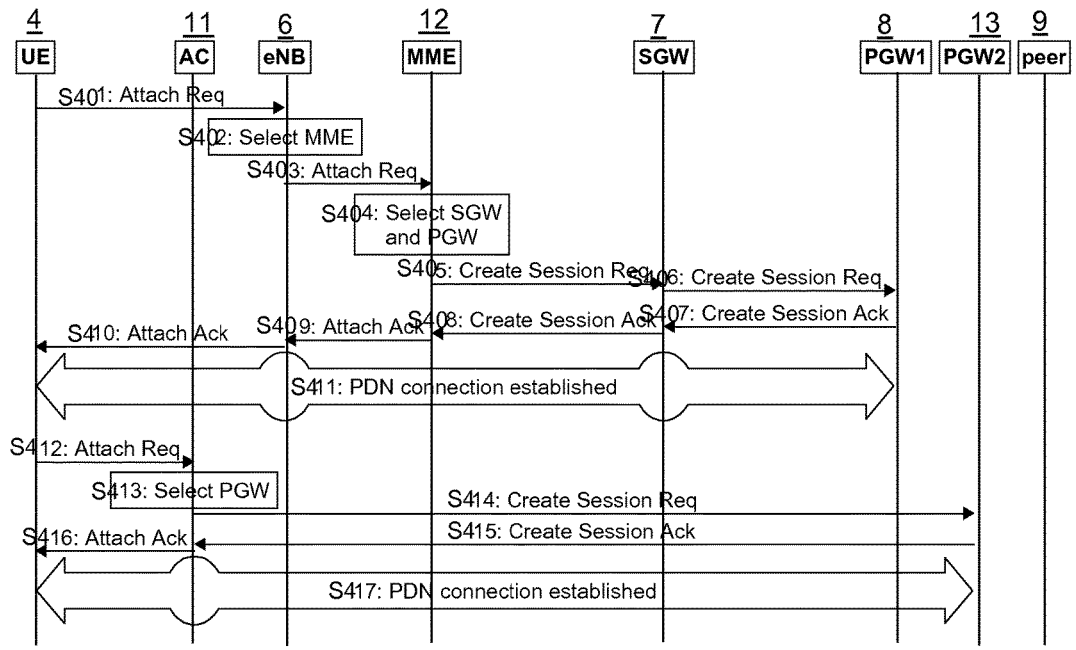
FIG. 4 is a signalling diagram showing signalling according to an exemplary embodiment.

The signalling diagram of FIG. 4 shows exemplary signalling for the UE 4 to attach to the two access networks 5, 10. Steps S401 to S411 show attachment to the 3GPP radio access network 5, and steps S412 to S417 show attachment to the WLAN radio access network 10. This is a simplified version of the attachment procedure described in 3GPP TS 23.401 (section 5.3.2) combined with the procedure described in 3GPP TS 23.402 (section 6.2/16.2). For example, step S412 typically includes multiple steps such as authentication and DHCP.

However, the concept of an MPTCP proxy 3 can only work if the UE 4 traffic is routed via a common point. The MPTCP proxy 3 can then be placed at that common point. There are several options for architectural placement of the MPTCP proxy 3. One option is to place the MPTCP proxy 3 "to the right" of the PGW; i.e. within the PDN, as described in IETF Internet-Draft "MPTCP proxies and anchors". A further option is to place the MPTCP proxy 3 in the PGW 8 or between the PGW 8 and the UE 4, for example in the SGW 7, an RNC, eNB 6 or Wi-Fi AC 11.

An MPTCP-capable end-host (such as the UE 4 or peer 9) may be unaware that the network deploys an MPTCP proxy 3. This model is known as "transparent proxy". It is the responsibility of the network to ensure that MPTCP subflows over different accesses are routed via the same MPTCP proxy 3.

Alternatively, the MPTCP-capable end-host may discover the existence of the MPTCP proxy 3 at the setup of the first MPTCP subflow. As part of that setup, the MPTCP proxy 3 signals its IP address to the end-host. The end-host uses that address when setting up additional subflows. In this model, additional MPTCP subflows do not need to be on the routing path between the two end-hosts.

A further alternative model uses an explicit MPTCP proxy. In this model, the MPTCP-capable end-host explicitly addresses the MPTCP proxy 3 in the setup of the first MPTCP subflow. This requires that the end-host is pre-configured with the address of the MPTCP proxy 3.

The models of implicit and explicit proxies are currently being standardized by IETF in Internet-Draft "MPTCP proxies and anchors". An advantage of the transparent model is that no IETF standardization is required, allowing operators to provide their own proprietary solutions.

In a first exemplary embodiment, UE 4 traffic is routed via a common point by ensuring that the PDN connections from the different access are setup such that they get routed via the common point. PDN connection setup is done at attachment time. This means that all UE 4 traffic, TCP traffic as well as other traffic, is routed via a common point.

The common point may in this example be the PGW 8, the eNB 6, the SGW 7 or the AC 11. Both accesses need to be able to find the common point. One way to achieve this is to provide a common database, termed a User Context Database (UCD) 14 where UE context can be stored. Nodes in both accesses can query that database 14 as part of a PDN connection setup procedure. The UDC 14 may be collocated with a Home Subscriber Server (HSS) or be a database separate from HSS. For the UCD concept to work, the UE must be identifiable as the same UE to both access networks 5, 10. If the IMSI is available then it may be used as common identifier. However, in the radio access network 10, an IMSI may not be available. In this case, other identifiers may need to be used.

PDN connection setup is performed before any UE 4 user data signalling. This solution works regardless how the MPTCP proxy 3 is addressed. The MPTCP proxy 3 may be fully transparent, in which case MPTCP proxy 3 inspects the TCP options to see if this passing traffic is MPTCP traffic. The MPTCP proxy 3 may be an explicit proxy, in which case the MPTCP proxy 3 will only need to inspect the target IP address of the packets to determine if traffic is MPTCP traffic. An implicit MPTCP proxy 3 will need to do the former for the first subflow and the latter for the additional subflows.

In the following examples it is assumed that there is an MPTCP proxy function 3 in the access to which the UE 4 first attaches. If there is no MPTCP proxy function 3 in that access then no MPTCP proxy service can be provided. MPTCP proxies 3 may be provided in both access networks 5, 10, or it may be assumed that the UE 4 will normally always be connected to the 3GPP radio access network 5 first.

Figure 5:
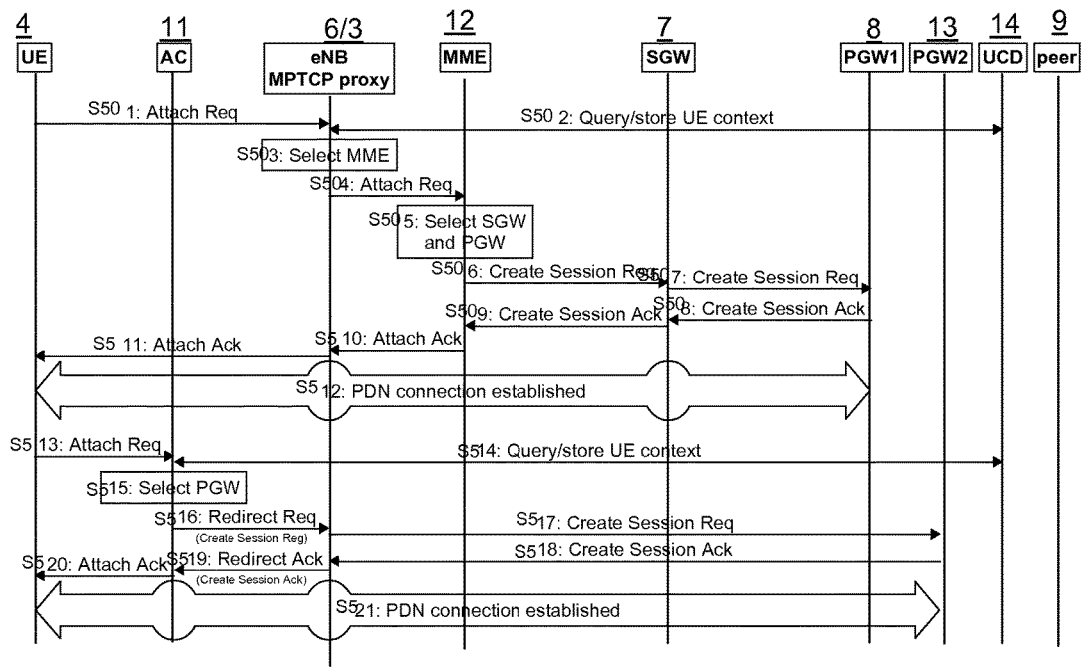
FIG. 5 is a signalling diagram showing exemplary signalling where a UE first attaches via a 3GPP radio access network and an MPTCP proxy function is located at an eNodeB.

Turning to FIG. 5, there is shown a signalling diagram illustrating the case where the UE 4 first attaches via the 3GPP radio access network 5, and the MPTCP proxy 3 is located at the eNB 6 (note that another variant is for the MPTCP proxy node 3 to be located at an RNC). The UE subsequently attaches via the WLAN radio access network 10. As discussed above, it is important to ensure that the PDN connection setup between the UE 4 and the peer 9 is established such that the WLAN PDN connection also gets routed via the eNB 6 that contains the MPTCP proxy function 3. The following numbering corresponds to that of FIG. 5:

S501. The UE 4 sends an attach request to the eNB 6.
S502. The eNB/proxy 6/3 queries the UCD 14. The UCD 14 replies if the UE 4 is already routed through an MPTCP proxy function 3 in the other access network. In this example, there is no other MPTCP proxy function 3 involved yet. The eNB 6 informs the UCD 4 that it will act as MPTCP proxy 3 for this UE 4.
S503. The eNB 6 selects an MME 12.
S504. An attach request is sent from the eNB to the MME 12.
S505. The MME 12 selects a SGW 7 and a PGW 8.
S506. The MME 12 sends a "Create Session Request" to the selected SGW 7.
S507. The SGW 7 sends the create session request to the selected PGW 8.
S508. The PGW 8 sends a create session acknowledgement to the SGW 7.
S509. The SGW 7 sends the create session acknowledgement to the MME 12.
S510. The MME sends an attach acknowledgement to the eNB 6.
S511. The eNB 6 sends the attach acknowledgement to the UE 4.
S512. At this point a PDN connection is established between the PGW 8 and the UE 4 via the 3GPP access network 5.
S513. In order to also connect via the WLAN radio access network 10, the UE 4 sends an attach request to the AC 11.
S514. The AC 11 sends a query to the UCD 14, which responds informing the AC 11 that the UE 4 is already using the MPTCP proxy function 3 in the 3GPP access network 5. The AC 11 receives the IP address of the MPTCP proxy function 3.
S515. The AC 11 selects a PGW 13 (may be different to the PGW 8 selected by the eNB 6).
S516. The AC 11 sends a redirect request to the MPTCP proxy 3 at the eNB 6. The redirect request encapsulates a create session request that would normally go to the selected further PGW 13.
S517. The eNB 6 sends the create session request to the selected further PGW 13.
S518. The further PGW 13 sends a create session acknowledgement to the eNB 6.
S519. The eNB 6 sends a redirect acknowledgement to the AC 11.
S520. The AC 11 sends an attach acknowledgement to the UE 4.
S521. At this point a PDN connection is established between the further PGW 13 and the UE 4 via the WLAN access network 10. In this case the PDN connection is via the eNB 6 hosting the MPTCP proxy 3.

Note that the UCD 14 is a new function that can be implemented in several ways. It could e.g. be co-located with another, existing, function as the HSS. Also the signalling to the UCD may be implemented in one of several ways. The signalling illustrated in FIG. 5 is example. Alternatives include the signalling between the eNB 6 and the UCD 14 passing the MME 12 by means of already existing interfaces. The query/store of the UE context (including MPTCP proxy function 3 identity), shown in step S502 may be split into separate query and storage steps. For example, the query may take place in step S502 as above but the storage may be triggered by step S510. In any case, the UCD 14 will need to be able to handle potential race conditions (i.e. if the UE 4 attaches to the other access network 10 at the same time, and the query from the other access network 10 comes before the storage of MPTCP proxy function 3 identity in the first access network 5.

Figure 6:
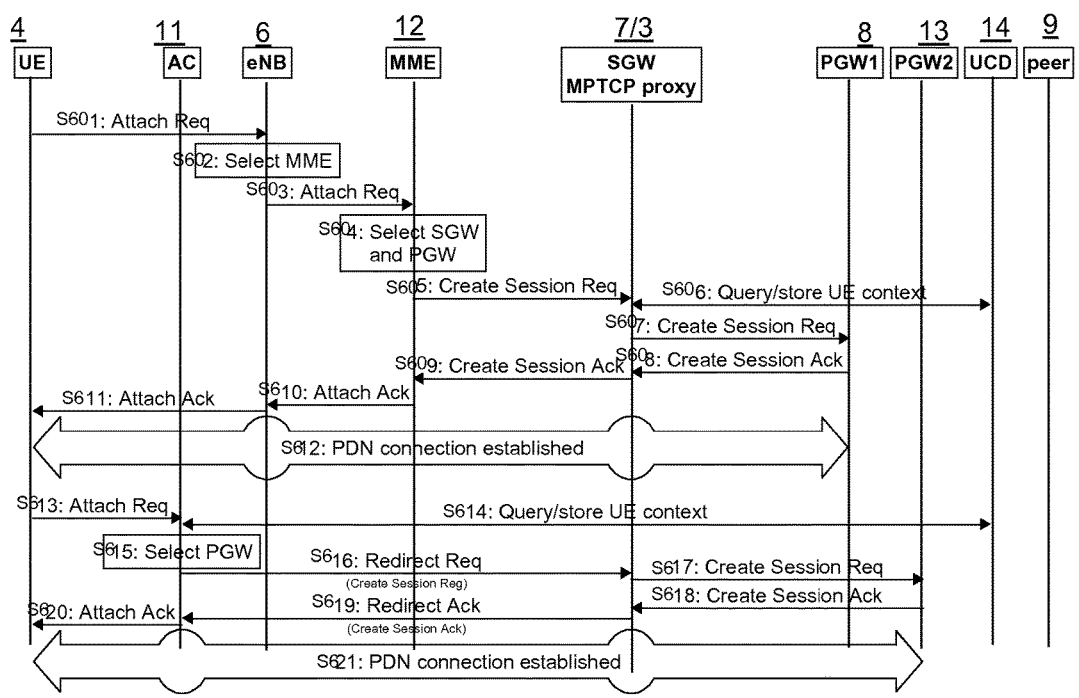
FIG. 6 is a signalling diagram showing exemplary signalling where a UE first attaches via a 3GPP radio access network and an MPTCP proxy function is located at a SGW.

Turning now to FIG. 6, there is shown a signalling diagram in which the UE 4 first attaches via the 3GPP radio access network 5, and the MPTCP proxy function 3 is located at the SGW 7.

Steps S601 to S621 correspond with steps S501 to S521, with the following exceptions:
S606 is now initiated from the SGW/proxy 7/3 (instead of step S502 in FIG. 5). As a consequence, the identity of the MPTCP proxy function 3 located at the SGW 7 is stored in the UCD 14.
S616 redirect request is still sent towards the MPTCP proxy function 3, but in this example the MPTCP proxy function 3 is located at the SGW 7.

Figure 7:
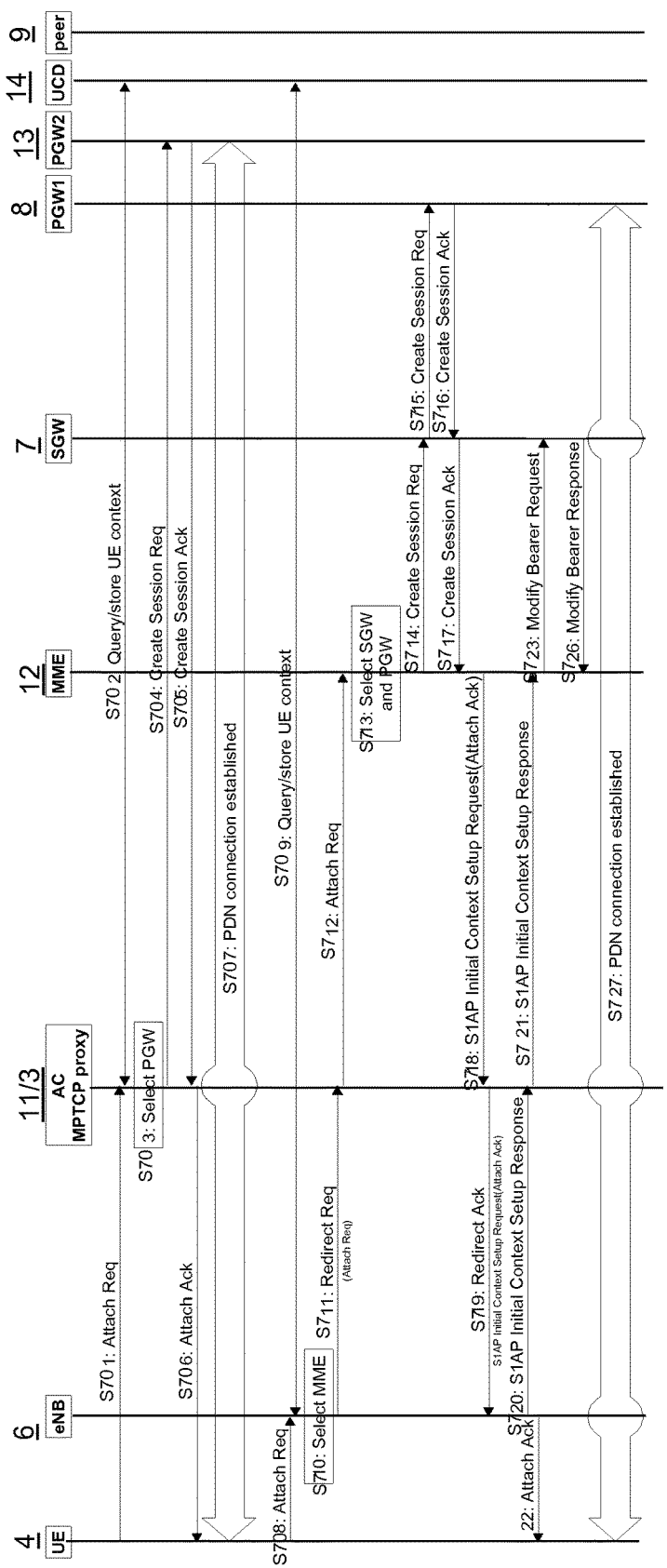
FIG. 7 is a signalling diagram showing exemplary signalling where a UE first attaches via a WLAN access network and the MPTCP proxy function is located at the AC.

FIG. 7 illustrates the case where the UE 4 first attaches in the WLAN access network 10 and the MPTCP proxy function 3 is located at the AC 11. The following numbering corresponds to that of FIG. 7:
S701. The UE 4 sends an attach request to the AC 11.
S702. The AC 11 sends a message to the UCD 14. If an MPTCP proxy node is already provisioned for the UE 4 then that is used. In this example, an MPTCP proxy function is not yet provisioned, so the UCD 14 stores information indicating that the MPTCP proxy function 3 is located at the AC 11.
S703. The AC 11 selects the further PGW 13.
S704. A create session request is sent to the further PGW 13.
S705. A create session acknowledgement is sent from the further PGW 13 to the AC 11.
S706. An attach acknowledgement is sent from the AC 11 to the UE 4.
S707. At this point, the UE 4 has established a PDN connection with the further PGW 13 via the WLAN access network 10.
S708. The UE 4 sends an attach request to the eNB 6 in the 3GPP access network 5.
S709. The eNB 6 sends a query to the UCD 14, which informs the eNB 6 that the MPTCP proxy function 3 is located at the AC 11 in the WLAN access network 10.
S710. The eNB 6 selects the MME 12.
S711. Instead of sending the attach request directly to the MME 12, the eNB 6 redirects that request to the AC 11 encapsulated in a redirect request.

S712. The AC 11 sends the attach request to the MME 12.
S713. The MME 12 selects the SGW 7 and the PGW 8.
S714. The MME 12 sends a create session request to the SGW 7.
S715. The SGW sends the crate session request to the PGW 8.
S716. The PGW 8 sends a create session acknowledgement to the SGW 7.
S717. The SGW 7 sends the create session acknowledgement to the MME 12.
S718. The MME 12 sends an S1AP initial context setup request to the AC 11.
S719. The MPTCP proxy 3 at the AC 11 sends a redirect acknowledgement to the eNB 6.
S720. The eNB 6 replies to the MPTCP proxy function 3 at the AC 11 with an S1AP initial context setup response.
S721. The MPTCP proxy function 3 at the AC 11 sends the S1AP initial context setup response to the MME 12.
S723. The MME 12 sends a modify bearer request to the SGW 7.
S726. The SGW 7 sends a modify bearer response to the MME 12.
S727. At this point, a PDN connection is established between the UE 4 and the PGW 8 via the 3GPP access network, and packets will be sent via the MPTCP proxy function 3 located at the AC 11 in the WLAN access network 10.

In step S712, the S1-MME interface signalling between the eNB 6 and the MME 12 is sent via the AC 11 for the purpose of redirecting the GTP-U tunnel for the UE 4 via the AC 11. To achieve this redirection, the AC 11 modifies the S1AP Initial Context Setup Request/Response messages (or any other messages used to setup a GTP-tunnel between the eNB and the SGW) as follows:

When the AC 11 receives the S1AP Initial Context Setup Request message from the MME 12, the Transport Layer Address and GTP-TEID IEs contain the values set by the SGW 7. The AC 11 overwrites the IEs with its own IP address and a (selected) TEID to make the eNB 6 forward the uplink traffic to the AC 11. The AC 11 also stores the initial Transport Layer Address and GTP-TEID IEs for the purpose of forwarding the uplink traffic on the correct GTP-U tunnel towards the SGW 7.

When the AC 11 receives the S1AP Initial Context Setup Response message from the eNB 6, the Transport Layer Address and GTP-TEID IEs contain the values set by the eNB 6. The AC 11 overwrites these IEs with its own IP address and (selected) TEID to make the SGW 7 forward the downlink traffic to the AC 11. The AC 11 also stores the initial Transport Layer Address and GTP-TEID IEs for the purpose of forwarding the downlink traffic on the correct GTP-U tunnel towards the eNB 7.

Another variant is to keep the S1-MME interface intact between eNB 6 and the MME 12. Instead, new signalling is added between the eNB 6 and the AC 11 as follows, based on the result of step S709 (that an MPTCP-proxy node 3 for the UE 4 is located at the AC 11):

1. When the eNB 6 has received any message that contains the GTP-U tunnel identifiers i.e. SGW IP Address and Tunnel Endpoint Identifier (TEID), it performs the following actions:

It creates two local identifiers, UE ID and Bearer ID and stores these in the local UE context for this bearer. The UE ID could be for example the eNB UE S1AP ID and the Bearer ID could be for example the ERAB-ID.

It also selects local GTP-U tunnel identifiers, i.e. eNB IP Address and TEID.

It creates a 1st new message including: for uplink the SGW IP Address and TEID, and for downlink eNB IP Address and TEID, UE ID and Bearer ID.

The 1st new message is sent to the AC 11.

In addition, the eNB 6 stores locally all the above information.

2. When the AC 11 receives the 1st new message, it performs the following actions:

The received information is used to create two different GTP-U tunnels, one between the eNB and AC, and another one between the AC 11 and the SGW 7.

For the GTP-U tunnel between the AC 11 and the SGW 7, the AC 11 starts using the received SGW IP Address and TEID as the destination information for the GTP-U tunnel towards the SGW 7. The AC 11 also selects local GTP-U tunnel identifiers, i.e. AC IP Address-2 and TEID-2 for the SGW 7 to use towards the AC 11.

For the GTP-U tunnel between the AC 11 and the eNB 6, the AC 11 starts using the received eNB IP Address and TEID as the destination information for the GTP-U tunnel towards the eNB 6. The AC 11 also selects local GTP-U tunnel identifiers, i.e. AC IP Address-1 and TEID-1 for the eNB 6 to use towards the AC 11.

The AC 11 creates a 2nd new message as a reply to the 1st new message and includes: UE ID and Bearer ID, the AC IP Address-1 and TEID-1, and AC IP Address-2 and TEID-2.

The message is sent back to the eNB 6.

3. When the eNB 6 receives the reply message from the AC 11, it performs the following actions:

The received information about AC IP Address-1 and TEID-1 is used by the eNB for the GTP-U tunnel towards the AC 11.

The received information about AC IP Address-2 and TEID-2 is used by the eNB 6 to reply towards the core network (i.e. MME) as the destination GTP-U tunnel information in the RAN. In this case the IP-address is towards the AC 11.

Figure 8:
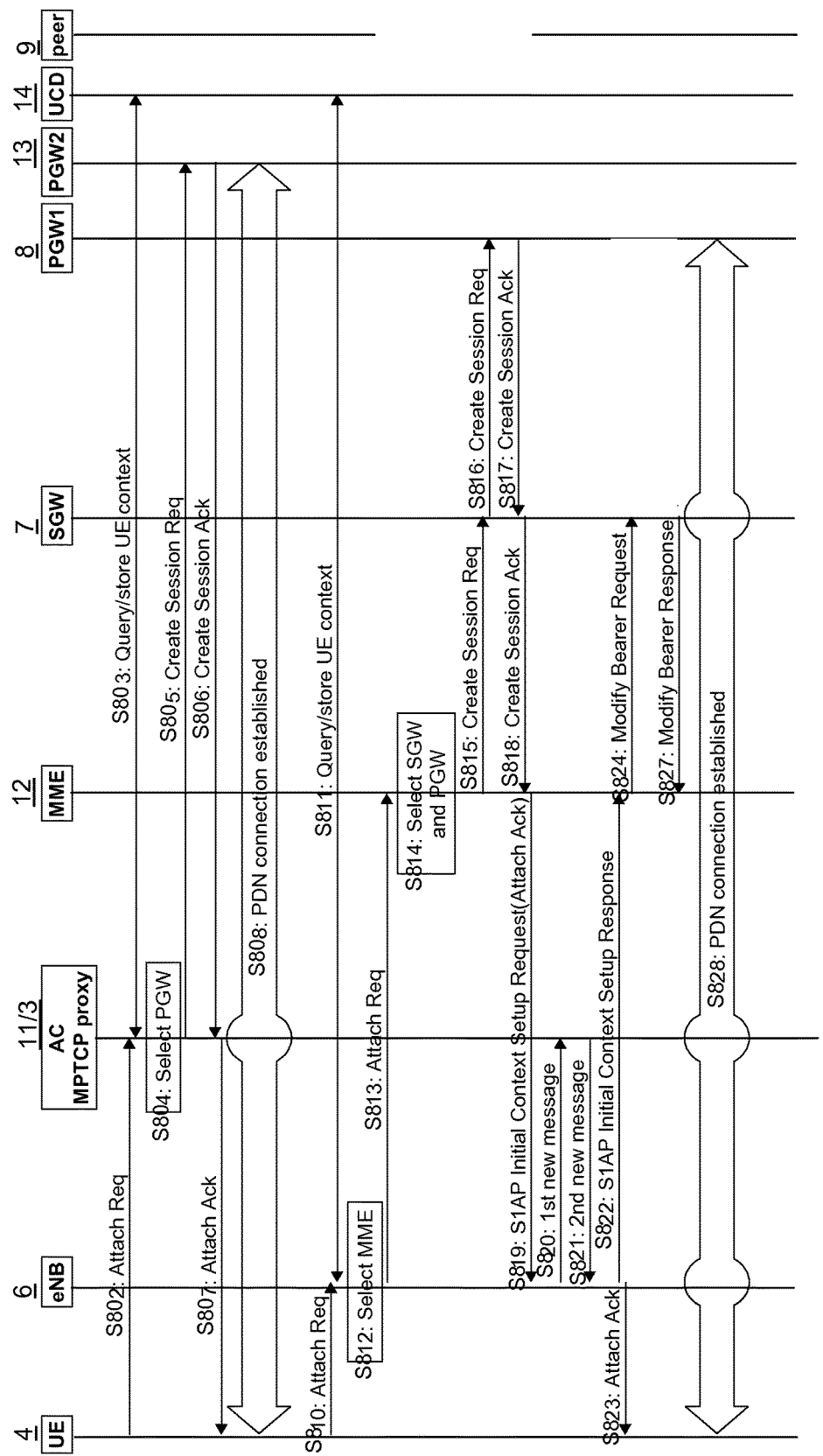
FIG. 8 is a signalling diagram showing alternative exemplary signalling where a UE first attaches via a WLAN access network and the MPTCP proxy function is located at the AC.

The above steps are illustrated in more detail in steps S801 to S828 in FIG. 8.

Figure 9:
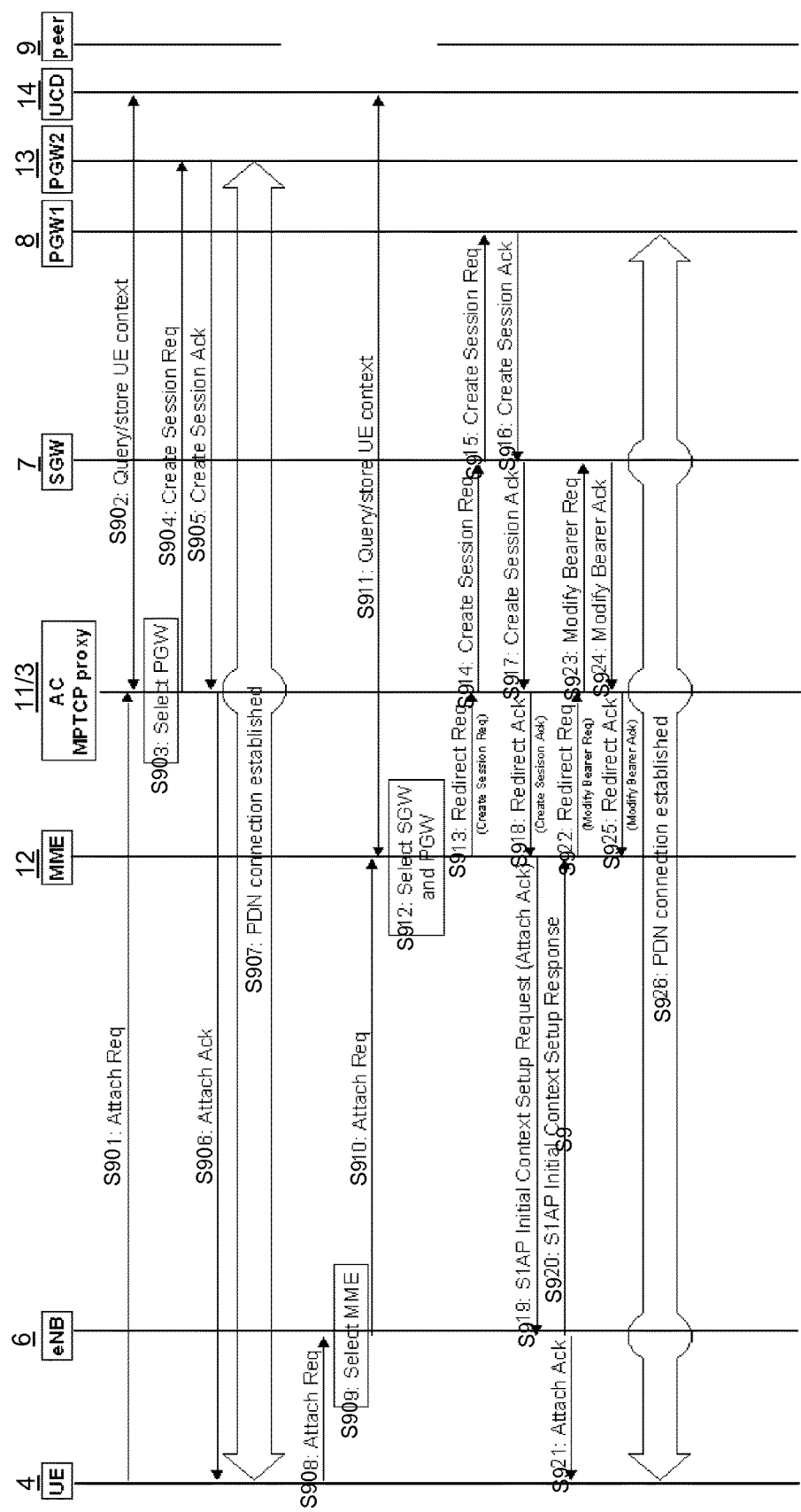
FIG. 9 is a signalling diagram showing further alternative exemplary signalling where a UE first attaches via a WLAN access network and the MPTCP proxy function is located at the AC.

As an alternative embodiment, instead of the eNB 6 sending the query to the UCD 14, the MME 12 could perform this step, as illustrated in the signalling diagram shown in steps S901 to S926 of FIG. 9. The route of the resulting PDN connection is the same: UE-eNB-AC-SGW-PGW.

It will be appreciated that a further variant is for the SGW 7 to perform the UCD 14 query/store step. The resulting PDN connection would then be routed: UE-eNB-SGW-AC-PGW.

The embodiments described above and illustrated in FIGS. 5 to 9 are for the case where a network-based PDN connection setup redirect is implemented. The procedures illustrated in FIGS. 5 to 9 provide solutions that are fully implemented in the network. The UE 4 is not impacted when it comes to PDN connection setup. However, it is possible to extend the signalling from the UE 4 to the network at attachment time.

Assume the case where the MPTCP proxy function 3 is located in the PGW 8. The UE 4 may indicate "MPTCP" in the Attach Request. Together with the APN (Access Point Name, the name of the PDN), the network could ensure that two PDN connections on different accesses end up at the same PGW 8. The procedure becomes very similar to the existing procedure of handover between 3GPP radio access and WLAN radio access.

Figure 10:
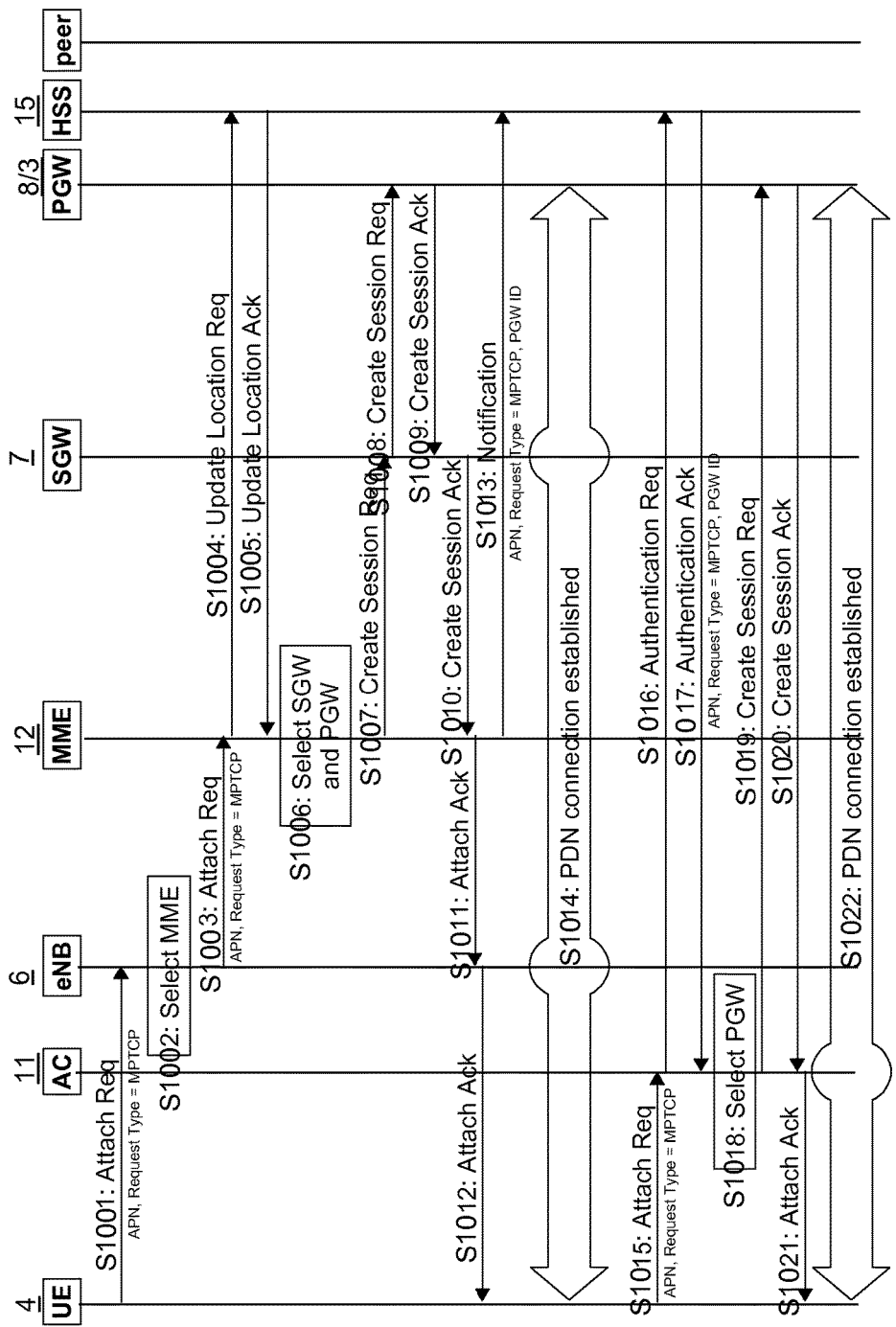
FIG. 10 is a signalling diagram showing exemplary signalling where a UE first attaches via a 3GPP radio access network and an MPTCP proxy function is located at a PGW.

The signalling in FIG. 10 shows the procedure when the UE 4 first attaches to the 3GPP radio, with the following numbering corresponding to that of FIG. 10:

S1001. The UE 4 sends an attach request to the eNB 6. The attach request indicates a new "Request Type". Existing request types include "Initial Attach" and "Handover Attach". A new request type, such as "MPTCP Attach" could be used. The request type is included in step S1001 together with an optional APN.

S1002. The eNB 6 selects the MME 12.

S1003. The eNB 6 forwards the request type to the MME 12. The MME has cached subscription data or, if not, queries an HSS 15 (steps S1004 and S1005) to find out if the UE 4 already is attached elsewhere (i.e. on a non-3GPP access). In this example, this is not the case and the attach procedure continues.

S1006-S1012. Completion of the attachment to the 3GPP access network 5.

S1013. The MME 12 notifies the HSS 15 about the selected PGW 8 for this UE 4, APN and attachment type.

S1014. At this point, the UE 4 has a PDN connection with the PGW 8 via the 3GPP access network 5.

S1015. The UE 4 also attaches via the WLAN access network 10. In this case, the UE 4 sends an attach request to the AC 11, the attach request indicating "MPTCP Attach" in the request type.

S1016-S1017. The AC 11 receives the UE 4 profile as part of the authentication. From the UE 4 profile, the AC 11 determines that the UE 4 is already "MPTCP Attach"-ed via the 3GPP access network 5.

S1018. As the PGW ID is included in the UE profile, the AC 11 selects the same PGW as the 3GPP access network 5 selected. As a result, both PDN connections get routed via one and the same PGW 8. This is therefore the best location for the MPTCP proxy function 3.

S1019-S1022. The attachment procedure continues until a PDN connection is established between the UE 4 and the PGW 8.

It will be appreciated that a similar call flow can take place if the UE 4 first attaches to the WLAN access network 10. This is illustrated in steps S1101 to S1122 of FIG. 11. The notification to the HSS 15 is now sent from the PGW 8 (step S1106). The MME 12 receives the UE 4 profile as part of the update location ack (step S1114).

Figure 11:
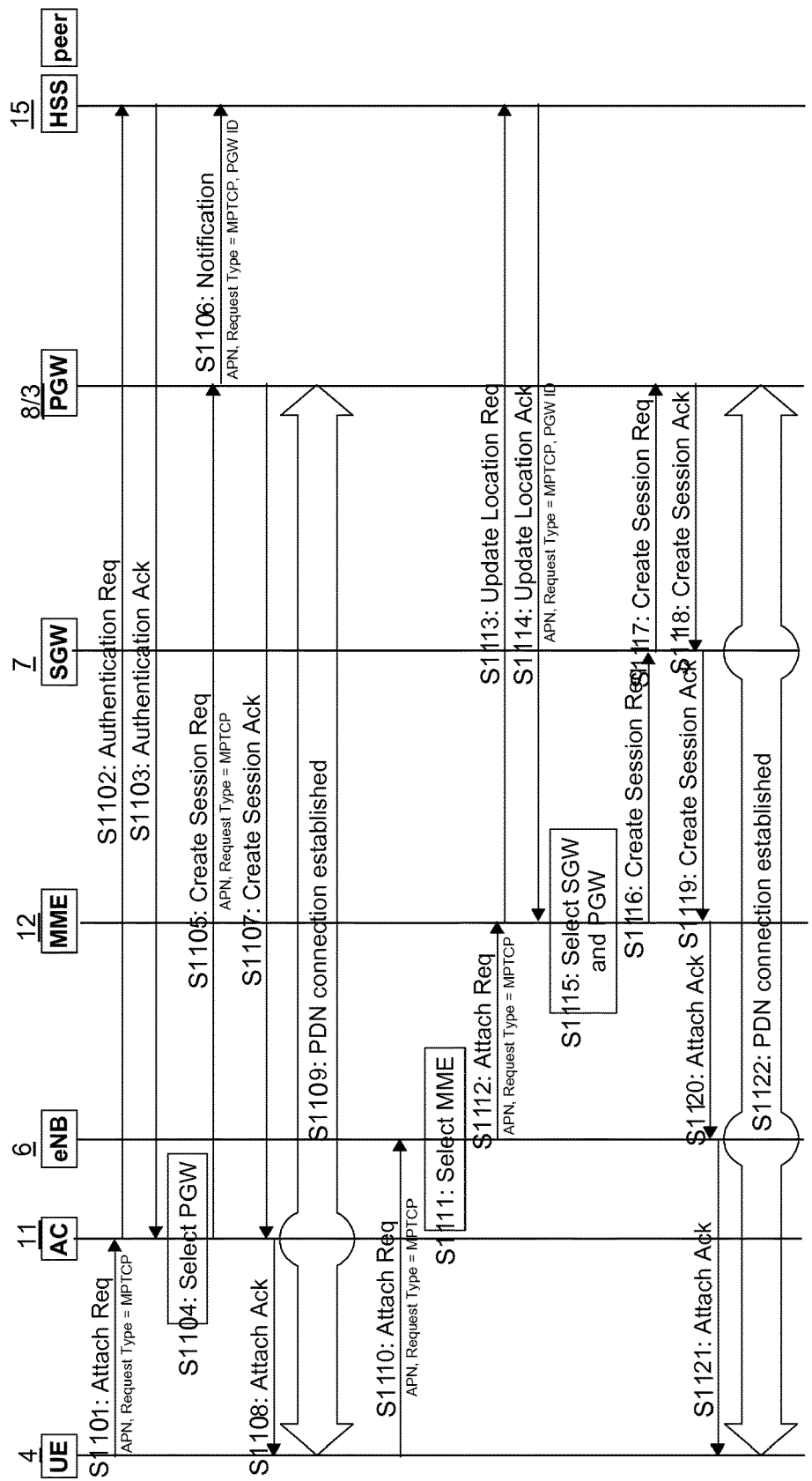
FIG. 11 is a signalling diagram showing exemplary signalling where a UE first attaches via a WLAN access network and an MPTCP proxy function is located at a PGW.

A potential problem with the call flow of FIGS. 10 and 11 arises from the fact that the 3GPP specification (3GPP Rel 11) does not mandate that the user profile in the HSS is cleaned up when the UE 4 detaches. If the UE 4 always indicates "MPTCP Attach", then the profile for this UE 4 and APN, received in either Update Location Ack (3GPP access network 5) or the Authentication Ack (WLAN access network 10), would always indicate a selected PGW ID. This will occur even if the UE 4 has already detached from the other access network. The result is that the UE 4 will be "stuck" at one and the same PGW 8 for its entire lifetime. This drastically limits the scalability of the overall system. For the above call flows to work, an HSS 15 clean-up function is required. This could take the form of, for example, an explicit clean-up signal from the PGW 8 to the HSS 15 when the UE 4 detaches. Another example could be that the HSS 15 periodically checks if a UE 4 is still attached. If not, the HSS 15 cleans up the UE 4 profile.

A further variant is for the UE 4 to be informed about the address of the MPTCP proxy function 3 when it access the first access network, and then the UE 4 informs the second access network about the address/location of the MPTCP proxy function in the first access. This would eliminate the need to attach to the same APN over both access networks (which is not supported in 3GPP Rel 11). It also solves the cleanup problem mentioned above.

In a further embodiment, a combination of UE-assisted and network-based setup is proposed. In this case, the UE 4 provides an "MPTCP Attach" indication in the PDN Connection establishment signalling and the network uses this indication to decide whether the network-based PDN Connection setup redirect described above with respect to any of FIGS. 5 to 9 should be performed. A benefit with such an approach is that the network will only perform the network-based PDN Connection setup redirect in the scenario in which the UE 4 explicitly requests the use of MPTCP.

Since the "MPTCP Attach" request would be sent in NAS signalling (in a 3GPP access network 5) and thus be parsed by the MME 12, this approach would work at least in the case where the MPTCP proxy function 3 is located in the SGW 7 or the AC 11. If the MPTCP proxy function 3 is located in the eNB 6, additional signalling from the MME 12 to the eNB 6 is required to, for example, send the UE 4 request to the eNB 6.

The embodiments described above with respect to FIGS. 5 to 11 propose solutions where the entire PDN connection via the second access network is routed via the MPTCP proxy function 3. An alternative solution would be to setup a normal PDN connection also in the second access network, and to break-out only MPTCP traffic from that PDN connection to the MPTCP proxy function 3 in the first access network.

Figure 12:
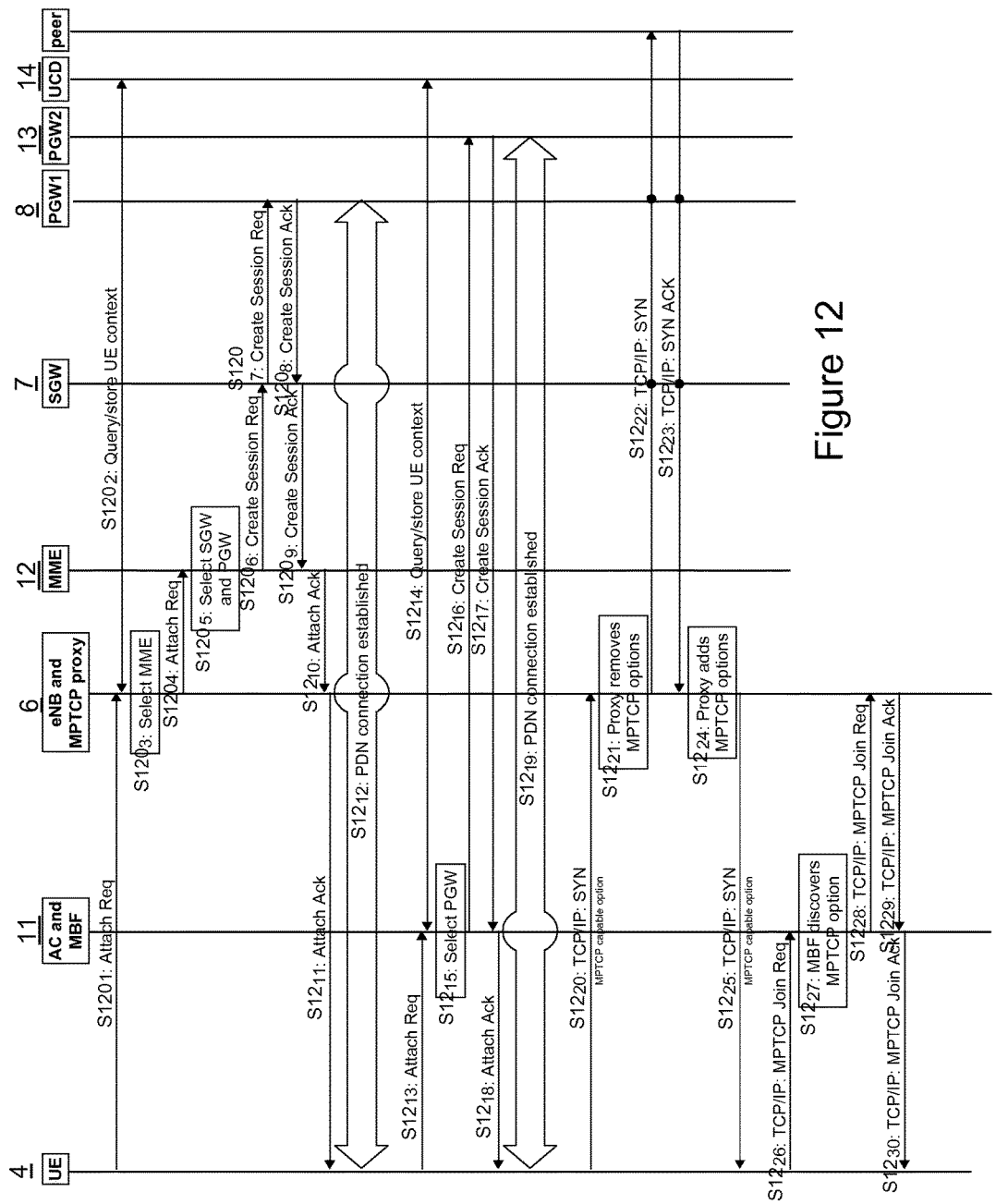
FIG. 12 is a signalling diagram showing exemplary signalling where a UE first attaches via a 3GPP radio access network and an MPTCP proxy function is located at an eNodeB, and breakout of MPTCP traffic is performed.

FIG. 12 illustrates an example where the UE 4 first attaches to a 3GPP access network and the MPTCP proxy function 3 is located at the eNB 6. Similar concepts can be applied when the SGW 7 or AC 11 contains the MPTCP proxy function. The idea can also be applied when the MPTCP proxy function 3 is co-located in the PGW 8. It is assumed that there is an MPTCP proxy function in the access to which the UE attaches first. If there is no MPTCP proxy function in that access then no MPTCP proxy service can be provided. An operator may provide MPTCP proxy functions in both access networks, or it may assume that a UE 4 will normally always be connected to the 3GPP radio access first. The following numbering corresponds to that of FIG. 12:

S1201. The UE 4 sends an attach request to the eNB 6.

S1202. The eNB/proxy 6/3 queries the UCD 14. The UCD 14 replies if the UE 4 is already routed through an MPTCP proxy function 3 in the other access network. In this example, there is no other MPTCP proxy function 3 involved yet. The eNB 6 informs the UCD 4 that it will provide the MPTCP proxy function 3 for this UE 4.

S1203. The eNB 6 selects an MME 12.

S1204. An attach request is sent from the eNB 6 to the MME 12.

S1205. The MME 12 selects a SGW 7 and a PGW 8.

S1206. The MME 12 sends a "Create Session Request" to the selected SGW 7.

S1207. The SGW 7 sends the create session request to the selected PGW 8.

S1208. The PGW 8 sends a create session acknowledgement to the SGW 7.

S1209. The SGW sends the create session acknowledgement to the MME 12.

S1210. The MME sends an attach acknowledgement to the eNB 6.

S1211. The eNB 6 sends the attach acknowledgement to the UE 4.

S1212. At this point a PDN connection is established between the PGW 8 and the UE 4 via the 3GPP access network 5.

S1213. In order to also connect via the WLAN radio access network 10, the UE 4 sends an attach request to the AC 11.

S1214. The AC 11 sends a query to the UCD 14, which responds informing the AC 11 that the UE 4 is already using the MPTCP proxy function 3 in the 3GPP access network 5. The AC 11 receives the IP address of the MPTCP proxy function 3. The AC may set up a tunnel to the MPTCP proxy function 3 (not shown in the flow chart). That tunnel can then be used later to transport MPTCP packets from the AC 11 to the MPTCP proxy function 3.

S1215. The AC 11 selects a further PGW 13 (may be different to the PGW 8 selected by the eNB 6).

S1216. The AC 11 sends a create request to the selected further PGW 13.

S1217. The further PGW 13 sends a create session acknowledgement to the AC 11.

S1218. The AC 11 sends an attach acknowledgement to the UE 4.

S1219. At this point a PDN connection is established between the further PGW 13 and the UE 4 via the WLAN access network 10.

S1220 to S1225. A first MPTCP subflow is setup, as defined in IETF Internet-Draft "draft-ietf-mptcp-multiaddressed".

S1226 to S1230. A second MPTCP subflow is setup by means of a "join" message as described in the Internet-Draft. However, the AC 11 contains an "MPTCP Break-out Function" (MBF). The MBF examines the TCP header of the packets transported through the WLAN PDN connection. Non-MPTCP packets are simply transported via the PDN connection to the further PGW 13. However, MPTCP packets are broken out from the PDN connection and routed via the tunnel setup in step S1214 to the MPTCP proxy function 3. If the MPTCP proxy function 3 is non-transparent, then the UE 4 will use the IP address of the MPTCP proxy function 3 in step S1226. There is then no need to examine the MPTCP options in the TCP header.

Note that the embodiment shown in FIG. 12 is concerned with a scenario in which the break-out function is located at the AC 11. It will be appreciated that the break-out function could be located at an alternative function, such as the PGW 8, the eNB 6 or the SGW 7.

Figure 13:
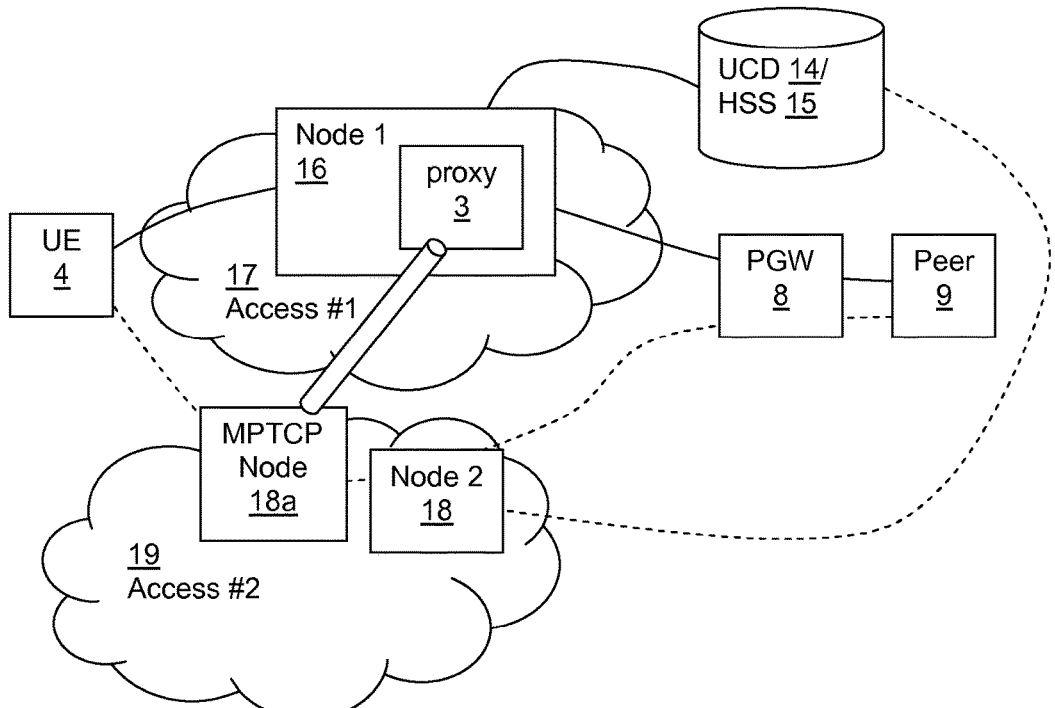
FIG. 13 illustrates schematically in a block diagram a generic network architecture illustrating principles of the embodiments.

Turning to FIG. 13, there is illustrated a generic network architecture illustrating the principles described above. A mobile terminal such as a UE 4 attaches via a first node 16 in a first access network 17 to establish a PDN connection with the PGW 8. As described above, in exemplary embodiments, the first node 16 becomes the host for the MPTCP proxy function 3. The UE 4 also attaches via a second node 18 in a second access network 19 to establish a further PDN connection with the PGW 8 (or a further PGW 13). Note that the second node 18 in the second access network 19 may handle MPTCP data, or MPTCP data may be handled in the second access network 19 by a separate, MPTCP node 18*a*. In this case, the second node 18 will need to instruct or otherwise ensure that the MPTCP node 18*a* redirects MPTCP data to the MPTCP proxy function 3 located at the first node. The first and second nodes 16, 18 have access to the remote database (as described above, this may be a UCD 14, an HSS 15, or other type of database). It will be apparent that the first access network 17 and the second access network 19 may be any of a WLAN access network, a 3GPP access network or any other type of radio access network.

Figure 1:
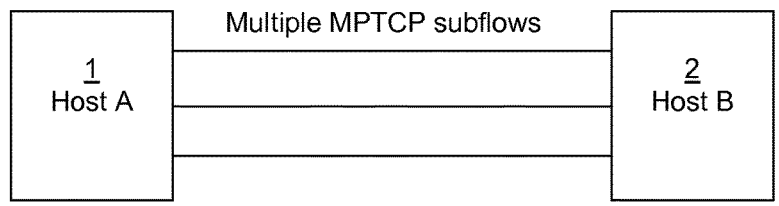
FIG. 1 illustrates schematically in a block diagram multiple MPTCP subflows between two hosts.
Figure 2:
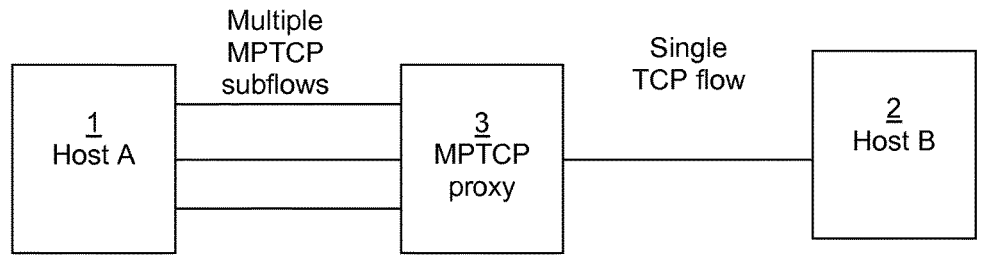
FIG. 2 illustrates schematically in a block diagram multiple MPTCP subflows between two hosts using a proxy.

In the example shown in FIG. 5, the first node is the eNB 6 and the second node is the AC 11. In the example of FIG. 6, the first node is the SGW 7 and the second node is the AC 11. In the examples of FIGS. 7 and 8, the first node is the AC 11 and the second node is the eNB 6. In the example of FIG. 9, the first node is the AC 11 and the second node is the MME 12. In the example of FIG. 10, the first node is the eNB 6 and the second node is the AC 11. In the example of FIG. 11, the first node is the AC 11 and the second node is the eNB 6. In the example of FIG. 1, the first node is the eNB 6 and the second node is the AC 11.

Figure 14:
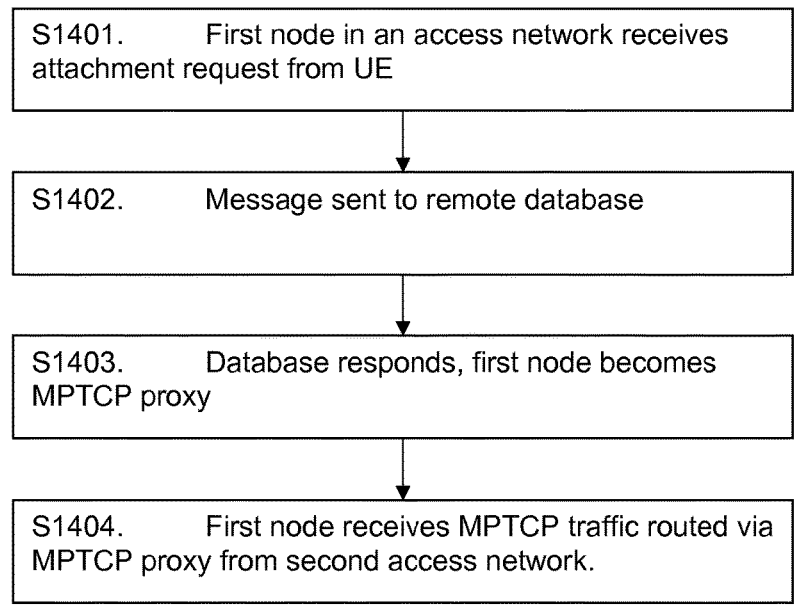
FIG. 14 is a flow diagram illustrating steps at a first node according to exemplary embodiments.
Figure 15:
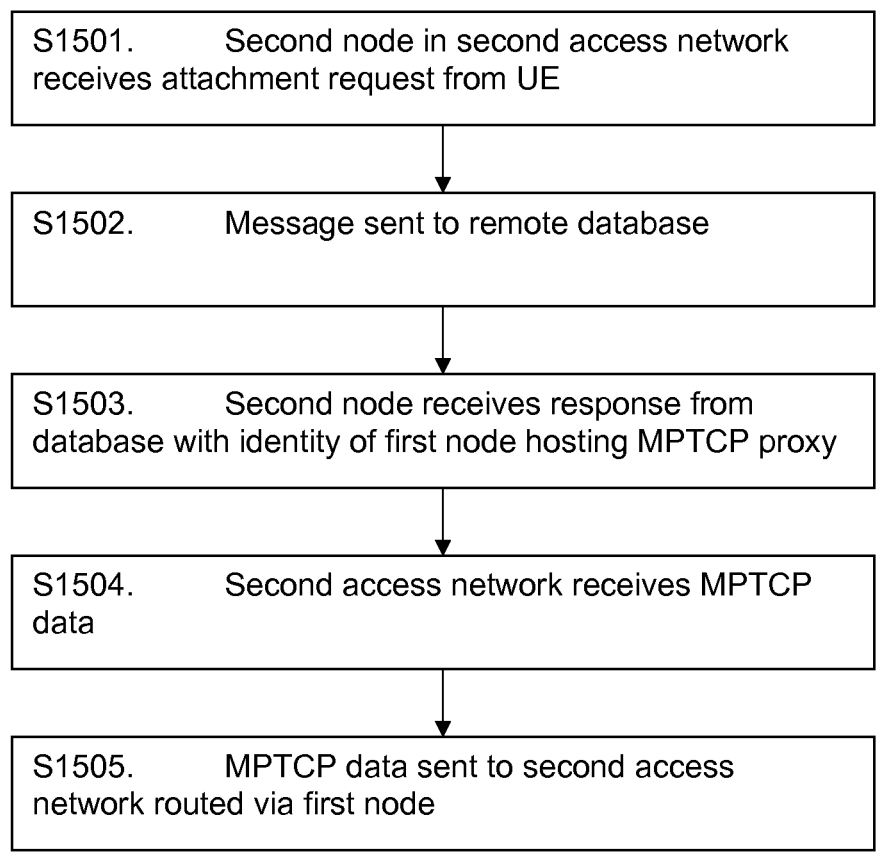
FIG. 15 is a flow diagram illustrating steps at a second node according to exemplary embodiments.
Figure 16:
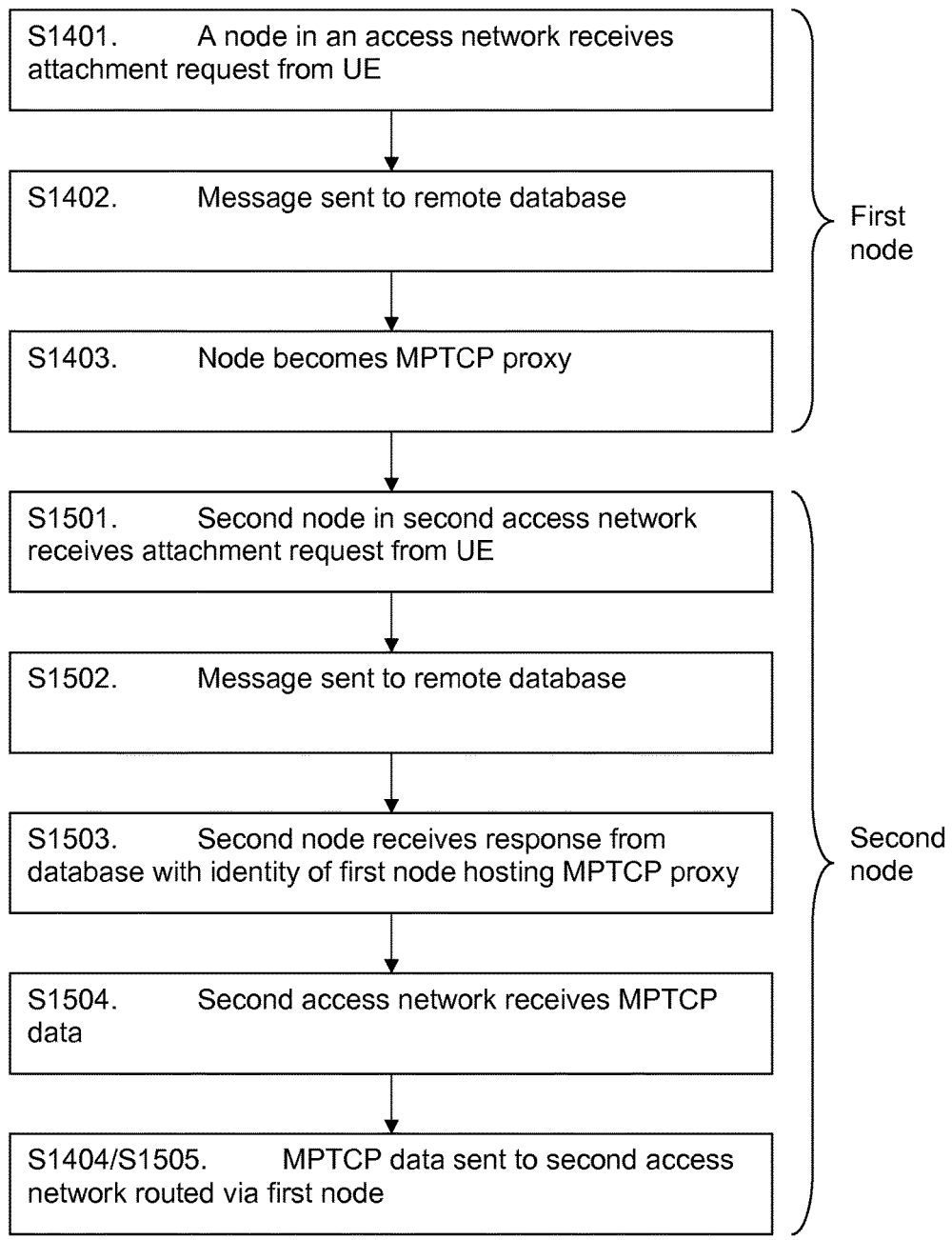
FIG. 16 is a flow diagram illustrating steps at the first and second nodes according to exemplary embodiments.

Turning to FIGS. 14, 15 and 16, there are shown flow diagrams illustrating steps according to various embodiments described above. The following numbering corresponds to that of FIGS. 14 to 16:

S1401. The first node 16 in the first access network 17 receives an attachment request from the UE 4.

S1402. The first node 16 sends a message towards the remote database 14; 15.

S1403. The remote database responds and the first node becomes co-located with the MPTCP proxy function 3. The remote database is provisioned with the identity of the first node 16.

S1501. The second node 18 in the second access network 19 receives an attachment request from UE 4.

S1502. The second node 18 sends a message to the remote database 14; 15.

S1503. The remote database responds to the second node 18 with the identity of the first node 16 that is co-located with the MPTCP proxy function 3.

S1504. The second access network 19 receives MPTCP data (this may be at the second node 18 or the MPTCP node 18*a* in the second access network 19).

S1505. MPTCP subflows that are sent to the second access network 19 are routed via the MPTCP proxy function 3 located at first node 16.

S1404. The MPTCP function 3 at the first node 16 receives the MPTCP traffic redirected from the second access network 19.

In this way, all MPTCP subflows relating to a session traverse the MPTCP proxy function 3.

Figure 17:
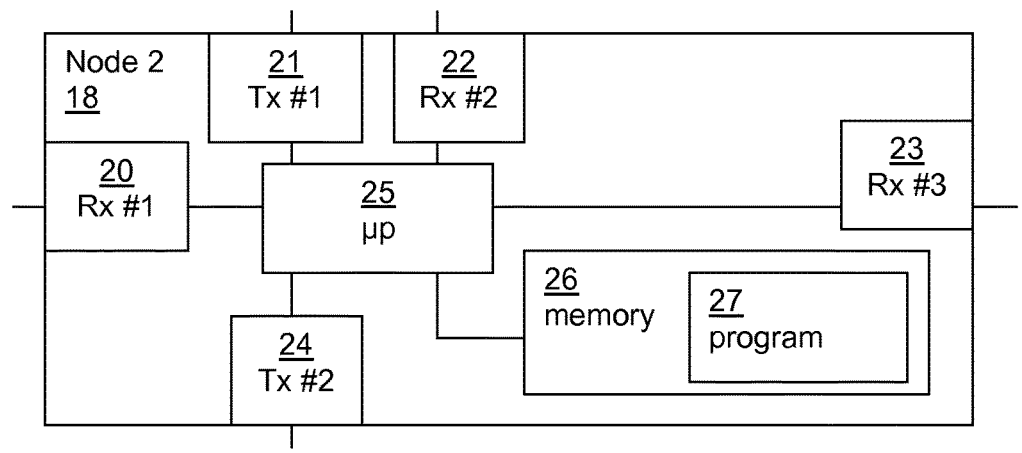
FIG. 17 illustrates schematically in a block diagram an exemplary second node.

FIG. 17 illustrates schematically in a block diagram a second node 18. As described above, the second node 18 may be, for example, a PDN, an AC, an eNodeB (eNB), an RNC, an SGW, an MME, an SGSN and so on. The second node 18 is provided with a first receiver 20 for receiving an attachment request from the UE 4. A first transmitter 21 is provided for sending a message to the UCD/HSS 14; 15. A second receiver 22 is also provided for receiving from the UCD/HSS 14; 15 a response. The response includes an identity of the node 16 hosting the MPTCP proxy function 3. In embodiments of the invention where the node 18 handles MPTCP data traffic, the node is also provided with a third receiver 23 for receiving MPTCP data and a second transmitter 24 for sending the received MPTCP data towards the MPTCP proxy function 3.

It will be appreciated that the various transmitters and receivers illustrated in FIG. 17 are described in functional terms only; in physical terms, the same transmitter may be used for sending different messages and the same receiver may be used for receiving different messages. The second node 18 may be provided with any number of physical transmitters, receivers or transceivers for sending and receiving messages.

A processor 25 is provided for controlling the second node 18 and the signalling. A computer readable medium in the form of a memory 26 may also be provided. This may be used to store a program 27 which, when executed by the processor 25, causes the node 18 to behave as described above.

Figure 18:
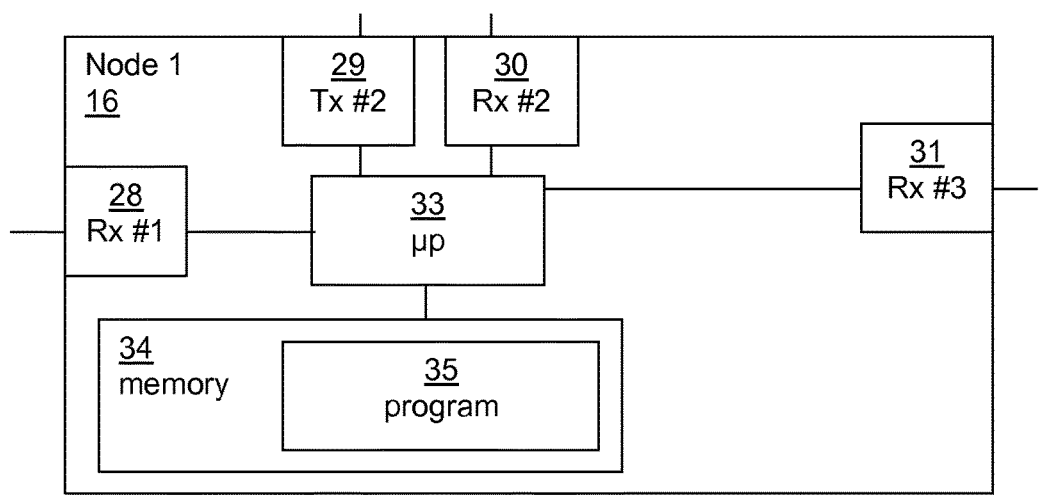
FIG. 18 illustrates schematically in a block diagram an exemplary first node.

FIG. 18 illustrates schematically the first node 16 in the first access network 17 as shown in FIG. 13. The first node 16 is provided with a first receiver 28 for receiving an attachment request from the UE 4. A first transmitter 29 is provided for sending a message to the UCD/HSS 14; 15. A second receiver 30 is also provided for receiving a response from the UCD/HSS 14; 15. The response indicates that the first node 16 may host the MPTCP proxy function 3. The first node is also provided with a third receiver 31 for receiving MPTCP data sent from the second access network 19.

It will be appreciated that the various transmitters and receivers illustrated in FIG. 18 are described in functional terms only; in physical terms, the same transmitter may be used for sending different messages and the same receiver may be used for receiving different messages. The first node 16 may be provided with any number of physical transmitters, receivers or transceivers for sending and receiving messages.

A processor 33 is provided for controlling the first node 16 and the signalling. A computer readable medium in the form of a memory 34 may also be provided. This may be used to store a program 35 which, when executed by the processor 33, causes the first node 16 to behave as described above.

Figure 19:
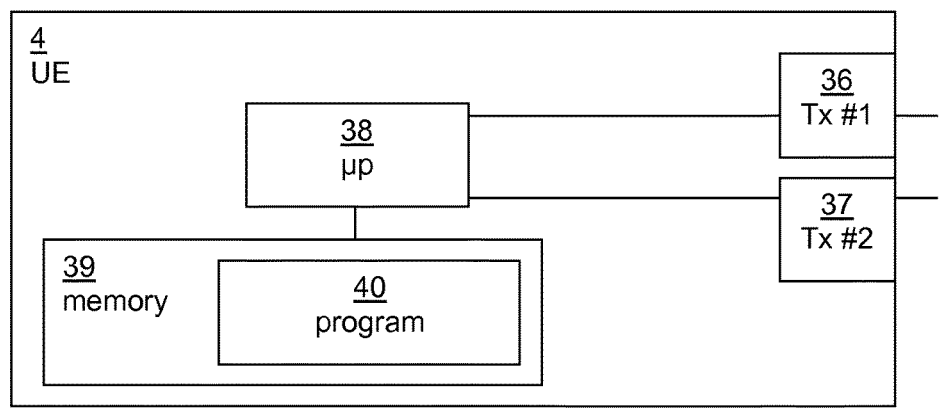
FIG. 19 illustrates schematically in a block diagram an exemplary mobile terminal.

FIG. 19 illustrates schematically a mobile terminal such as a UE 4. The UE 4 is provided with a first transmitter 36 for sending a first request to attach to the first access network 17. The request includes an indicator that the UE 4 is capable of handling an MPTCP session. A second transmitter 37 is also provided for sending a second request to attach to the second access network 19, the second request also including the indicator. This ensures that both access networks are aware that the UE 4 can handle MPTCP sessions and can coordinate to ensure that a single MPTCP in one of the access networks (or at a PGW) can be used.

It will be appreciated that the transmitters illustrated in FIG. 19 are described in functional terms only; in physical terms, the same transmitter may be used for sending both messages. The UE 4 may be provided with any number of physical transmitters, receivers or transceivers for sending and receiving messages.

A processor 38 is provided for controlling the UE 4 and the signalling. A computer readable medium in the form of a memory 39 may also be provided. This may be used to store a program 40 which, when executed by the processor 38, causes the UE 4 to behave as described above.

Figure 20:
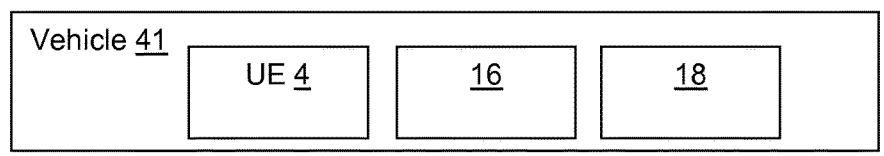
FIG. 20 illustrates schematically in a block diagram an exemplary vessel or vehicle.

Referring to FIG. 20, there is illustrated schematically in a block diagram a vehicle or vessel 41 such as a ship, a train, a car, a truck and so on. This vessel or vehicle 41 may have any of the first node 16, the second node 18 or the UE located 4 on it.

The techniques described above allow the identity of an MPTCP proxy to be determined in a network architecture. The techniques also provide mechanisms by which other nodes that need to be aware of the existence of an MPTCP proxy function 3 are made aware of the existence of the MPTCP proxy function. It will be appreciated by a person of skill in the art that various modifications may be made to the above described embodiment without departing from the scope of the present disclosure. For example, the functions of the network node are described as being embodied at a single node, but it will be appreciated that different functions may be provided at different network nodes. Furthermore, the description above assumes a UE is the mobile terminal, but it will be appreciated that the same techniques can be used in any type of communications access network that use different types of mobile terminal and communication network using MPTCP where a mobile terminal may access the network over more than one access network.

The following acronyms have been used in the above description:
3GPP 3rd Generation Partnership Project
AC Access Controller
AP Access Point
eNB eNodeB
E-UTRAN Evolved Universal Terrestrial Radio Access Network
GERAN GSM EDGE Radio Access Network
HSPA High Speed Packet Access
HSS Home Subscriber Server
IETF Internet Engineering Task Force
IMSI International Mobile Subscriber Identity
IP Internet Protocol
LAN Local Area Network
LTE Long-term Evolution
MBF MPTCP Break-out Function
MME Mobility Management Entity
MPTCP Multi-path TCP
PDN Packet Data Network
PGW PDN Gateway
RAN Radio Access Network
RNC Radio Network Controller
SGSN Serving GPRS Support Node
SGW Serving Gateway
TCP Transmission Control Protocol
UE User Equipment
UTRAN Universal Terrestrial Radio Access Network
WCDMA Wideband Code Division Multiple Access
WLAN Wireless LAN

The invention claimed is:

1. A method of handling Multipath Transmission Control Protocol, MPTCP, signaling in a communications network, the communications network comprising a first node in a first access network hosting an MPTCP proxy function, and a second node in a second access network, the method comprising, at the second node:
    receiving from a mobile terminal an attachment request that includes an MPTCP attachment type indicator indicating that the mobile terminal is capable of handling an MPTCP session;
    sending to a database a message;
    receiving from the database a response, wherein the response includes an identity of the first node;
    receiving, from the mobile terminal, MPTCP data that is destined to an end host; and
    sending to the first node that hosts the MPTCP proxy, and as result of the receipt from the database of the response that includes an identity of the first node, the MPTCP data to be transmitted from the MPTCP proxy towards the end host.

2. The method according to claim 1, wherein the MPTCP proxy function is located at or between a Packet Data Network (PDN) Gateway and the mobile terminal.

3. The method according to claim 1, further comprising determining whether data received at the second node comprises MPTCP data and, responsive to determining that the data does not comprise the MPTCP data, sending the data directly towards its destination.

4. The method according to claim 1, wherein the database is a User Context Database and the message comprises a query for the identity of the first node hosting the MPTCP proxy function.

5. The method according to claim 1, wherein the database is a storing function comprising a Home Subscriber Server.

6. The method according to claim 1, further comprising establishing a tunnel between the second node and the MPTCP proxy function, wherein the tunnel is used for sending at least MPTCP data.

7. The method according to claim 1, further comprising sending an instruction to an MPTCP node in the second access network to establish a tunnel between the MPTCP proxy function and the MPTCP node, wherein the tunnel is used for sending at least MPTCP data.

8. The method according to claim 1, wherein the first node hosting the MPTCP proxy function is located in a first access network.

9. The method according to claim 1, wherein the second access network is selected from any of a Wireless Local area Network, an Evolved Universal Terrestrial Radio Access Network, a Global System for Mobile Communications (GSM) Enhanced Data rates for GSM Evolution (EDGE) Radio Access Network, a Universal Terrestrial Radio Access Network, a Wideband Code Division Multiple Access network and a High Speed Packet Access network.

10. The method according to claim 1, wherein the second node is selected from any of an Access Controller, an eNodeB, a Radio Network Controller, a Serving General Packet Radio Service (GPRS) Support node, a Mobility Management Entity and a Serving Gateway.

11. The method according to claim 1, wherein the first node hosting the MPTCP proxy function is selected from any of a Packet Data Network Gateway, an Access Controller, an eNodeB, a Radio Network Controller and a Serving Gateway.

12. A method of handling Multipath Transmission Control Protocol, MPTCP, data in a communications network sent via an MPTCP proxy function, the method comprising, at a first node in a first access network:
receiving from a mobile terminal an attachment request that includes an MPTCP attachment type indicator indicating that the mobile terminal is capable of handling an MPTCP session;
sending to a database a message;
receiving from the database a response, the response indicating that the first node may host the MPTCP proxy function; and
receiving MPTCP data from the mobile terminal, wherein the MPTCP data is routed through a second node in a second access network and is destined to an end host.

13. The method according to claim 12, wherein the first node comprises any of a Packet Data Network Gateway, an Access Controller, an eNodeB, a Radio Network Controller and a Serving Gateway.

14. The method according to claim 12, wherein the message includes an instruction for the database to store an identity of the first node hosting the MPTCP proxy function.

15. A node for determining an identity of a Multipath Transmission Control Protocol, MPTCP, proxy function in a communications network, the node comprising:
a first receiver for receiving from a mobile terminal an attachment request that includes an MPTCP attachment type indicator indicating that the mobile terminal is capable of handling an MPTCP session;
a first transmitter for sending to a database a message;
a second receiver for receiving from the database a response, the response including an identity of a first node hosting the MPTCP proxy function;
a third receiver for receiving, from the mobile terminal, MPTCP data that is destined to an end host; and
a second transmitted for sending to the first node that hosts the MPTCP proxy, and as result of the receipt from the database of the response that includes an identity of the first node, the MPTCP data to be transmitted from the MPTCP proxy towards the end host.

16. The node according to claim 15, the node further comprising:
a third receiver for receiving MPTCP data; and
a second transmitter for sending the received MPTCP data towards the MPTCP proxy function.

17. A node arranged to handle Multipath Transmission Control Protocol, MPTCP, signalling in a communications network sent via an MPTCP proxy function, the node comprising:
a first receiver for receiving from a mobile terminal an attachment request that includes an MPTCP attachment type indicator indicating that the mobile terminal is capable of handling an MPTCP session;
a first transmitter for sending to a database a message;
a second receiver for receiving from the database a response, the response indicating that the node may host the MPTCP proxy function; and
a third receiver for receiving MPTCP data from the mobile terminal, wherein the MPTCP data is routed through a second node in a second access network and is destined to an end host.

18. The method according to claim 1, wherein the first node is at least one of a vessel and a vehicle.

19. The method according to claim 12, wherein the first node is at least one of a vessel and a vehicle.

20. A non-transitory computer readable medium having stored thereon computer readable code, which when executed by a processor on a node, cause the node to perform the following operations:
receiving from a mobile terminal an attachment request that includes an MPTCP attachment type indicator indicating that the mobile terminal is capable of handling an MPTCP session;
sending to a database a message;
receiving from the database a response, wherein the response includes an identity of a first node;
receiving, from the mobile terminal, MPTCP data that is destined to an end host; and
sending to the first node that hosts the MPTCP proxy, and as result of the receipt from the database of the response that includes an identity of the first node, the MPTCP data to be transmitted from the MPTCP proxy towards the end host.

21. A non-transitory computer readable medium having stored thereon computer readable code, which when executed by a processor on at a first node in a first access network, cause the first node to perform the following operations:
receiving from a mobile terminal an attachment request that includes an MPTCP attachment type indicator indicating that the mobile terminal is capable of handling an MPTCP session;
sending to a database a message;
receiving from the database a response, the response indicating that the first node may host an MPTCP proxy function; and receiving MPTCP data from the mobile terminal, wherein the MPTCP data is routed through a second node in a second access network and is destined to an end host.

* * * * *